(12) United States Patent
Dino

(10) Patent No.: US 7,799,742 B2
(45) Date of Patent: Sep. 21, 2010

(54) EQUIVALENT CIRCULATING DENSITY CONTROL IN DEEP WATER DRILLING

(75) Inventor: David Dino, Cranbury, NJ (US)

(73) Assignee: Elementis Specialties Inc., Hightstown, NJ (US)

( * ) Notice: Subject to any disclaimer, the term of this patent is extended or adjusted under 35 U.S.C. 154(b) by 208 days.

(21) Appl. No.: 12/075,027

(22) Filed: Mar. 7, 2008

(65) Prior Publication Data

US 2009/0227478 A1 Sep. 10, 2009

(51) Int. Cl.
C09K 8/36 (2006.01)
C07C 233/00 (2006.01)

(52) U.S. Cl. ............... 507/129; 507/138; 507/910; 554/35

(58) Field of Classification Search .......... 507/129, 507/138, 910; 554/35
See application file for complete search history.

(56) References Cited

U.S. PATENT DOCUMENTS

| | | |
|---|---|---|
| 2,461,730 A | 2/1949 | Gunderson |
| 2,482,760 A | 9/1949 | Goebel et al. |
| 2,482,761 A | 9/1949 | Goebel et al. |
| 2,731,481 A | 1/1956 | Harrison et al. |
| 2,793,219 A | 5/1957 | Barrett et al. |
| 2,964,545 A | 12/1960 | Harrison |
| 2,978,468 A | 4/1961 | Hampton et al. |
| 2,994,660 A | 8/1961 | Reddie |
| 3,134,759 A | 5/1964 | Kirkpatrick |
| 3,157,681 A | 11/1964 | Fischer et al. |
| 3,256,304 A | 6/1966 | Fischer et al. |
| 3,514,399 A | 5/1970 | Robinson |
| 4,039,459 A | 8/1977 | Fischer |
| 4,505,833 A | 3/1985 | Lipowski |
| 4,508,628 A | 4/1985 | Walker |
| 5,260,268 A | 11/1993 | Forsberg |
| 5,330,662 A | 7/1994 | Jahnke |
| 5,536,871 A | 7/1996 | Santhanam |
| 5,599,777 A | 2/1997 | Jahnke |
| 5,620,946 A | 4/1997 | Jahnke |
| 5,710,110 A | 1/1998 | Cooperman |
| 5,909,779 A | 6/1999 | Patel |
| 5,939,475 A | 8/1999 | Reynolds |
| 6,187,719 B1 | 2/2001 | Dino |
| 6,291,406 B1 | 9/2001 | Rose |
| 6,291,663 B1 | 9/2001 | O'Brien |
| 6,339,048 B1 | 1/2002 | Santhanam |
| 6,462,096 B1 | 10/2002 | Dino |
| 6,576,597 B2 | 6/2003 | Dobson, Jr. |
| 6,589,917 B2 | 7/2003 | Patel |
| 6,887,832 B2 | 5/2005 | Kirsner |
| 7,278,485 B2 | 10/2007 | Kirsner |
| 7,387,985 B2 | 6/2008 | Kippie |
| 2004/0102332 A1* | 5/2004 | Thompson et al. .......... 507/100 |
| 2004/0110642 A1 | 6/2004 | Thompson et al. |
| 2005/0049147 A1 | 3/2005 | Patel |
| 2006/0065402 A9 | 3/2006 | Fontana |
| 2006/0073987 A1 | 4/2006 | Mueller |
| 2007/0197403 A1 | 8/2007 | Dino |
| 2007/0281867 A1 | 12/2007 | Massam |
| 2008/0032900 A1 | 2/2008 | Kirsner |
| 2008/0188382 A1* | 8/2008 | Thompson et al. .......... 507/251 |

FOREIGN PATENT DOCUMENTS

| | | |
|---|---|---|
| EP | 1018534 | 7/2000 |
| WO | 1989011516 | 11/1989 |

OTHER PUBLICATIONS

J. W. Jordan, "Proceedings of the 10th National Conference on Clays and Minerals" Pergamon Press, Austin (1963), 299-308.
"Fatty Nitrogen Derived Amides Categories High Production Volume (HPV) Chemicals Challenge: Assessment of Data Availability and Test Plan," American Chemistry Council's Fatty Nitrogen Derivatives Panel Amides Task Group, Prepared by Toxicology/Regulatory Services, Inc., Sep. 16, 2004.

* cited by examiner

*Primary Examiner*—Timothy J. Kugel
(74) *Attorney, Agent, or Firm*—Morgan, Lewis & Bockius LLP

(57) ABSTRACT

A method of providing a substantially constant rheological profile of a drilling fluid over a temperature range of about 120° F. to about 40° F. includes adding a drilling fluid additive to the drilling fluid, wherein the drilling fluid additive includes the reaction product of a carboxylic acid with at least two carboxylic moieties; and a polyamine having an amine functionality of two or more. A composition, such as an oil based drilling fluid, includes the reaction product of a carboxylic acid with at least two carboxylic moieties and a polyamine having an amine functionality of two or more.

43 Claims, No Drawings

EQUIVALENT CIRCULATING DENSITY CONTROL IN DEEP WATER DRILLING

BACKGROUND OF THE INVENTION

Drilling fluids have been used since the very beginning of oil well drilling operations in the United States and drilling fluids and their chemistry are an important area for scientific and chemical investigations. Certain uses and desired properties of drilling fluids are reviewed in U.S. Patent Application 2004/0110642 and U.S. Pat. Nos. 6,339,048 and 6,462,096, issued to the assignee of this application, the entire disclosures of which are incorporated herein by reference.

Nevertheless, the demands of the oil-well drilling environment require increasing improvements in rheology control over broad temperature ranges. This becomes particularly true, for example, as the search for new sources of oil involves greater need to explore in deep water areas and to employ horizontal drilling techniques.

SUMMARY OF THE INVENTION

According to some embodiments, a method of providing a substantially constant rheological profile of a drilling fluid over a temperature range of about 120° F. to about 40° F. includes adding a drilling fluid additive to the drilling fluid, wherein the drilling fluid additive consists essentially of a reaction product of a carboxylic acid with at least two carboxylic moieties, and a polyamine having an amine functionality of two or more.

In some embodiments, the carboxylic acid is a dimer fatty acid, such as a hydrogenated, partially hydrogenated or non-hydrogenated dimer acids with from about 20 to about 48 carbon atoms. In some embodiments, the carboxylic acid is a trimer fatty acid.

In some embodiments, the polyamine is polyethylene polyamine. In some embodiments, the polyamine includes ethylenediamine, diethylenetriamine, triethylenetriamine or tetrayethylenepentamine.

In certain embodiments, one or more emulsifiers is added to the drilling fluid. In some embodiments, an organoclay may be added to the drilling fluid. In some embodiments, a non-organoclay rheological additive may be added to the drilling fluid. In some embodiments, a fluid loss reducing additive may be added to the drilling fluid. In certain embodiments, a solvent is added to the drilling fluid.

In certain embodiments, the increase in high shear rate viscosity of the drilling fluid is less than about 75% when the drilling fluid is cooled from about 120° F. to about 40° F. In some embodiments, the increase in high shear rate viscosity of the drilling fluid is less than about 60% when the drilling fluid is cooled from about 120° F. to about 40° F.

In some embodiments, less than about 2 ppb drilling fluid additive is added to the drilling fluid. In certain embodiments, less than about 1.5 ppb drilling fluid additive is added to the drilling fluid. In some embodiments, less than about 1.0 ppb drilling fluid additive is added to the drilling fluid.

According to some embodiments, the reaction product has an average molecular weight of about 2,000 to about 2030. In some embodiments, the reaction product has an average molecular weight of about 2,010 to about 2,020.

According to some embodiments, a method of providing a substantially constant rheological profile of an oil-based drilling fluid over a temperature range of about 120° F. to about 40° F. includes adding a drilling fluid additive to the drilling fluid, wherein the drilling fluid additive comprises a reaction product of a carboxylic acid with at least two carboxylic moieties; and a polyamine having an amine functionality of two or more, and wherein the drilling fluid additive has an EC50(72 h) value of greater than about 400 mg/l as determined from the OECD 201 protocol using skeletonema costatum and an LC50(96 h) value of greater than about 400 mg/kg as determined from the Parcom 1995 protocol using scophthalmus maximus.

According to some embodiments, a method of providing a substantially constant rheological profile of an oil-based drilling fluid over a temperature range of about 120° F. to about 40° F. includes adding a drilling fluid additive to the drilling fluid, wherein the drilling fluid additive comprises a reaction product of a carboxylic acid with at least two carboxylic moieties; and a polyamine having an amine functionality of two or more, and wherein the drilling fluid additive has an LC50(48 h) value greater than about 1,000 mg/l as determined from the ISO 14669 protocol of acartia tonsa and an LC50(10 day) greater than about 5,000 mg/kg as determined from Parcom 1995 protocol using corophium volutator.

According to some embodiments, a method of providing a substantially constant rheological profile of an oil-based drilling fluid over a temperature range of about 120° F. to about 40° F. includes adding a drilling fluid additive to the drilling fluid, wherein the drilling fluid additive comprises a reaction product of a carboxylic acid with at least two carboxylic moieties; and a polyamine having an amine functionality of two or more, and wherein the drilling fluid additive has an environmental rating (Offshore Chemical Notification Scheme, "OCNS," Group) of Class C, Class D, or Class E as defined by the Centre for Environment, Fisheries and Aquaculture Science ("CEFAS").

According to some embodiments, a composition includes a reaction product of a carboxylic acid with at least two carboxylic moieties and a polyamine having an amine functionality of two or more.

In some embodiments, an oil based drilling fluid includes a reaction product of a carboxylic acid with at least two carboxylic moieties and a polyamine having an amine functionality of two or more.

DETAILED DESCRIPTION OF THE EMBODIMENTS

In some embodiments, a drilling fluid additive includes a reaction product of (i) a carboxylic acid with at least two carboxylic moieties, and (ii) a polyamine having an amine functionality of two or more. In some embodiments, the addition of a drilling fluid additive of the present invention to a drilling fluid provides a substantially constant rheological profile of a drilling fluid over a temperature range of about 120° F. to about 40° F.

Drilling Fluid Additive

Carboxylic Acids

Any carboxylic acid with at least two carboxylic moieties can be used for producing the reaction product component of the drilling fluid additive. In some embodiments, the carboxylic acid is a dimer acid. In some embodiments, the carboxylic acid includes dimer acids of $C_{16}$ and/or $C_{18}$ fatty acid. In certain embodiments, such dimer acids are fully hydrogenated, partially hydrogenated, or not hydrogenated at all. In some embodiments, dimer acids include products resulting from the dimerization of $C_{16}$ to $C_{18}$ unsaturated fatty acids.

In some embodiments, the dimer acids have an average of about 18 to about 48 carbon atoms. In some embodiments, the dimer acids have an average of about 20 to 40 carbon atoms. In one embodiment, the dimer acids have an average of about 36 carbon atoms.

Suitable dimer acids may be prepared from $C_{18}$ fatty acids, such as oleic acids. Examples of suitable dimer acids are described in U.S. Pat. Nos. 2,482,760, 2,482,761, 2,731,481, 2,793,219, 2,964,545, 2,978,468, 3,157,681, and 3,256,304, the entire disclosures of which are incorporated herein by reference.

Examples of suitable dimer acids include the Empol® product line available from Cognis Inc. (eg: Empol® 1061), and Pripol® dimer acids available from Uniqema (eg: Pripol® 1013).

In some embodiments, the carboxylic acid includes a trimer acid. In some embodiments, trimer acids are included in the drilling fluid additive though the addition of commercial dimer acid products such as Empol® 1061 or Pripol® 1013. In some embodiments, the carboxylic acid does not include a trimer acid.

Many commercially available dimer fatty acids contain a mixture of monomer, dimer, and trimer acids. In some embodiments, the dimer fatty acid has a specific dimer content as increased monomer and trimer concentration may hinder the additive's performance. In some embodiments, commercial products are distilled or otherwise processed to ensure certain suitable dimer content. In some embodiments, a suitable dimer acid has a dimer content of at least about 80%. In some embodiments, suitable dimer acid has a dimer content of at least about 90%. An example of a suitable dimer acid includes Empol® 1061, which has a dimer acid content of 92.5%-95.5%, a trimer acid content of 1.5%-3.5% and a monoacid content of 2.5%-5.0%.

Polyamines

According to some embodiments, polyamines having an amine functionality of two or more are used for the preparation of a reaction product that may be incorporated in the drilling fluid additive. In some embodiments, polyamines from the family of polyethylene polyamines having an amine functionality of two or more are used.

Di-, tri-, and polyamines and their combinations may be suitable for use in the drilling fluid additive. Examples of such amines may include ethylenediamine, diethylenetriamine, triethylenetetramine, tetraethylenepentamine and other members of this series. In some embodiments, branched polyamines and polyamines made with different alkyl groups are used.

In some embodiments, a suitable triamine is diethylenetramine (DETA). DETA has been assigned a CAS No. of 111-40-0 and is commercially available from Huntsman International.

Making the Reaction Product

Specifics on processing of polyamines and carboxylic acids are well known and can be used in making the reaction product for incorporation in the drilling fluid additive. In some embodiments, the molar ratio between the amine functional group and carboxyl functional group is about 4:1 to about 1:1. In some embodiments, the molar ratio between the amine functional group and carboxyl functional group is about 1.5:1 to about 3:1. In some embodiments, the molar ratio between the amine functional group and carboxyl functional group is about 2:1. For example, mixtures of more than one dimer acid and/or more than one polyamine can be used. In some embodiments, these reactions may generate imidazolines and other side products.

In some embodiments, the reaction product has an average molecular weight of about 1,990 to about 2,040. In some embodiments, the reaction product has an average molecular weight of about 2,000 to about 2,030. In other embodiments, the reaction product has an average molecular weight of about 2,010 to about 2,020. In some embodiments, the reaction product has an average molecular weight of about 2,014.

Additional Components

Optionally, additional ingredients may be added to the drilling fluid additive or may be added directly to the drilling mud itself. In some embodiments, a fatty acid amide is added directly to the drilling mud.

In some embodiments, suitable fatty amides are amides of fatty acids that are sparingly soluble in drilling fluids. In some embodiments, suitable fatty amides include high temperature melting amides of fatty acids that are sparingly soluble in drilling muds, such as the Armid® product line by Akzo Nobel. In some embodiments, alkoxylated fatty amides, such as the Ethomid® product line by Akzo Nobel can be used. For example, a suitable alkoxylated fatty amide may include Ethomid® O/17 which has 7 moles of EO on oleamide.

Preparation of the Drilling Fluids

In some embodiments, compositions according to the present invention may be used as an additive to oil- or synthetic-based drilling fluids. In some embodiments, compositions according to the present invention may be used as an additive for oil- or synthetic-based invert emulsion drilling fluids employed in a variety of drilling applications.

The term oil- or synthetic-based drilling fluid is defined as a drilling fluid in which the continuous phase is hydrocarbon based. Oil- or synthetic-based drilling fluids formulated with over 5% water or brine may be classified as oil- or synthetic-based invert emulsion drilling fluids. In some embodiments, oil- or synthetic-based invert emulsion drilling fluids may contain water or brine as the discontinuous phase in any proportion up to about 50%. Oil muds may include invert emulsion drilling fluids as well as all oil based drilling fluids using synthetic, refined or natural hydrocarbon base as the external phase.

According to some embodiments, a process for preparing invert emulsion drilling fluids (oil muds) involves using a mixing device to incorporate the individual components making up that fluid. In some embodiments, primary and secondary emulsifiers and/or wetting agents (surfactant mix) are added to the base oil (continuous phase) under moderate agitation. The water phase, typically a brine, may be added to the base oil/surfactant mix along with alkalinity control agents and acid gas scavengers. In some embodiments, rheological additives as well as fluid loss control materials, weighting agents and corrosion inhibition chemicals may also be included. The agitation may then be continued to ensure dispersion of each ingredient and homogenize the resulting fluidized mixture.

Base Oil/Continuous Phase

According to some embodiments, diesel oil, mineral oil, synthetic oil, vegetable oil, fish oil, paraffinics, and/or ester-based oils can all be used as single components or as blends.

Brine Content

In some embodiments, water in the form of brine is often used in forming the internal phase of the drilling fluids. According to some embodiments, water can be defined as an aqueous solution which can contain from about 10 to 350,000 parts-per-million of metal salts such as lithium, sodium, potassium, magnesium, cesium, or calcium salts. In some embodiments, brines used to form the internal phase of a drilling fluid according to the present invention can also contain about 5% to about 35% by weight calcium chloride and may contain various amounts of other dissolved salts such as sodium bicarbonate, sodium sulfate, sodium acetate, sodium borate, potassium chloride, sodium chloride or formates (such as sodium, calcium, or cesium). In some embodiments, glycols or glycerin can be used in place of or in addition to brines.

In some embodiments, the ratio of water (brine) to oil in the emulsions according to the present invention may provide as high a brine content as possible while still maintaining a stable emulsion. In some embodiments, suitable oil/brine ratios may be in the range of about 97:3 to about 50:50. In some embodiments, suitable oil/brine ratios may be in the range of about 90:10 to about 60:40, or about 80:20 to about 70:30. In some embodiments, the preferred oil/brine ratio may depend upon the particular oil and mud weight. According to some embodiments, the water content of a drilling fluid prepared according to the teachings of the invention may have an aqueous (water) content of about 0 to 50 volume percent.

Organoclays/Rheological Additives Other than Organoclays

In some embodiments, the drilling fluid additive includes an organoclay. According to some embodiments, organoclays made from at least one of bentonite, hectorite and attapulgite clays are added to the drilling fluid additive. There are a large number of suppliers of such clays in addition to Elementis Specialties' BENTONE® product line including Rockwood Specialties, Inc. and Sud Chemie GmbH. In addition to or in place of organoclays, polymeric rheological additives, such as THIXATROL® DW can be added to the drilling fluid. Examples of suitable polymeric rheological additives are described in U.S. Patent Application No. 2004-0110642, which is incorporated by reference herein in its entirety.

Emulsifiers

According to some embodiments, an emulsifier can also be added to the drilling fluid in order to form a more stable emulsion. The emulsifier may include organic acids, including but not limited to the monocarboxyl alkanoic, alkenoic, or alkynoic fatty acids containing from 3 to 20 carbon atoms, and mixtures thereof. Examples of this group of acids include stearic, oleic, caproic, capric and butyric acids. In some embodiments, adipic acid, a member of the aliphatic dicarboxylic acids, can also be used. According to some embodiments, suitable surfactants or emulsifiers include fatty acid calcium salts and lecithin. In other embodiments, suitable surfactants or emulsifiers include oxidized tall oil, polyaminated fatty acids, and partial amides of fatty acids.

In some embodiments, heterocyclic additives such as imidazoline compounds may be used as emulsifiers and/or wetting agents in the drilling muds. In other embodiments, alkylpyridines may be used to as emulsifiers and/or wetting agents in the drilling muds.

Industrially obtainable amine compounds for use as emulsifiers may be derived from the epoxidation of olefinically unsaturated hydrocarbon compounds with subsequent introduction of the N function by addition to the epoxide group. The reaction of the epoxidized intermediate components with primary or secondary amines to form the corresponding alkanolamines may be of significance in this regard. In some embodiments, polyamines, particularly lower polyamines of the corresponding alkylenediamine type, are also suitable for opening of the epoxide ring.

Another class of the oleophilic amine compounds that may be suitable as emulsifiers are aminoamides derived from preferably long-chain carboxylic acids and polyfunctional, particularly lower, amines of the above-mentioned type. In some embodiments, at least one of the amino functions is not bound in amide form, but remains intact as a potentially salt-forming basic amino group. The basic amino groups, where they are formed as secondary or tertiary amino groups, may contain hydroxyalkyl substituents and, in particular, lower hydroxyalkyl substituents containing up to 5 and in some embodiments up to 3 C atoms in addition to the oleophilic part of the molecule.

According to some embodiments, suitable N-basic starting components for the preparation of such adducts containing long-chain oleophilic molecule constituents may include but are not limited to monoethanolamine or diethanolamine.

Weight Agents

In some embodiments, weighting materials are also used to weight the drilling fluid additive to a desired density. In some embodiments, the drilling fluid is weighted to a density of about 8 to about 18 pounds per gallon and greater. Suitable weighting materials may include barite, ilmenite, calcium carbonate, iron oxide and lead sulfide. In some embodiments, commercially available barite is used as a weighting material.

Filtrate Reduces

In some embodiments, fluid loss control materials are added to the drilling fluid to control the seepage of drilling fluid into the formation. In some embodiments, fluid loss control materials are liganite-based or asphalt-based. Suitable filtrate reducers may include amine treated lignite, gilsonite and/or elastomers such as styrene butadiene.

Blending Process

In some embodiments, drilling fluids may contain about 0.1 pounds to about 15 pounds of the drilling fluid additive per barrel of fluids. In other embodiments, drilling fluids may contain about 0.1 pounds to about 10 pounds of the drilling fluid additive per barrel of fluids, and in still other embodiments, drilling fluids may contain about 0.1 pounds to about 5 pounds of the drilling fluid additive per-barrel of fluids.

As shown above, a skilled artisan will readily recognize that additional additives such as weighting agents, emulsifiers, wetting agents, viscosifiers, fluid loss control agents, and other agents can be used with a composition according to the present invention. A number of other additives besides rheological additives regulating viscosity and anti-settling properties can also be used in the drilling fluid so as to obtain desired application properties, such as, for example, anti-settling agents and fluid loss-prevention additives.

In some embodiments, the drilling fluid additive can be cut or diluted with solvent to vary the pour point or product viscosity. Any suitable solvent or combination of solvents may be used. Suitable solvents may include but are not limited to: diesel, mineral or synthetic oils, block copolymers of EO/PO and/or styrene/isoprene, glycols including polyalkylene glycols, alcohols including polyethoxylated alcohols, polyethoxylated alkyl phenols or polyethoxylated fatty acids, various ethers, ketones, amines, amides, and esters.

Method of Use

In some embodiments, a drilling fluid additive may be added to a drilling fluid. In some embodiments, the drilling fluid additive may be added to a drilling fluid in combination with other additives, such as Thixatrol® DW and Bentone® 155, both by Elementis Specialties.

In some embodiments, a drilling fluid additive is added to a drilling fluid in an amount of about 0.1 ppb to about 30 ppb. In other embodiments, a drilling fluid additive is added to a drilling fluid in an amount of about 0.25 ppb to about 15.0 ppb. In other embodiments, a drilling fluid additive is added to a drilling fluid in an amount of about 0.25 ppb to about 5 ppb. In some embodiments, a drilling fluid additive is added to a drilling fluid in an amount of about 0.5 ppb. In some embodiments, a drilling fluid additive is added to a drilling fluid in an amount of about 0.75 ppb. In some embodiments, a drilling fluid additive is added to a drilling fluid in an amount of about 1.0 ppb. In some embodiments, a drilling fluid additive is added to a drilling fluid in an amount of about 1.5 ppb. In some embodiments, a drilling fluid additive is added to a drilling fluid in an amount of about 2.0 ppb. In some embodiments, a smaller amount of a drilling fluid additive of the present invention is required to achieve comparable rheological stability results as a known drilling fluid additive.

In some embodiments, the addition of the drilling fluid additive to a drilling fluid results in a substantially constant rheological profile throughout a temperature range. A substantially constant rheological profile of a drilling fluid may be determined by the change in viscosity of the drilling fluid as the temperature of the drilling fluid is reduced from bottom hole temperature typically encountered in deep water drilling, to temperatures typically encountered in the riser in deep water drilling. In some embodiments, the rheological profile of a drilling fluid is measured in terms of the increase in high rate (600 rpm) Farm 35A viscosity of the drilling fluid when the drilling fluid is cooled from about 120° F. to about 40° F. In some embodiments, a substantially constant rheological profile is achieved when the change in high shear rate viscosity of a drilling fluid is less than about 90% over a temperature range of about 120° F. to about 40° F. In other embodiments, a substantially constant rheological profile is achieved when the change in high shear rate viscosity of a drilling fluid is less than about 85% over a temperature range of about 120° F. to about 40° F. In some embodiments, a substantially constant Theological profile is achieved when the change in high shear rate viscosity is less than about 80% over a temperature range of about 120° F. to about 40° F. In some embodiments, a substantially constant Theological profile is achieved when the change in high shear rate viscosity is less than about 75% over a temperature range of about 120° F. to about 40° F. In other embodiments, a substantially constant rheological profile is achieved when the change in high shear rate viscosity of a drilling fluid is less than about 70% over a temperature range of about 120° F. to about 40° F. In other embodiments, a substantially constant Theological profile is achieved when the change in high shear rate viscosity of a drilling fluid is less than about 65% over a temperature range of about 120° F. to about 40° F. In other embodiments, a substantially constant rheological profile is achieved when the change in high shear rate viscosity of a drilling fluid is less than about 60% over a temperature range of about 120° F. to about 40° F. In other embodiments, a substantially constant rheological profile is achieved when the change in high shear rate viscosity of a drilling fluid is less than about 55% over a temperature range of about 120° F. to about 40° F. In other embodiments, a substantially constant rheological profile is achieved when the change in high shear rate viscosity of a drilling fluid is less than about 50% over a temperature range of about 120° F. to about 40° F. The viscosity of the drilling fluid may be measured according to API RP 13B procedures.

In some embodiments, a drilling fluid according to the present invention may have a lower viscosity at 40° F. than conventional muds formulated with sufficient organoclay to provide suspension at bottom hole temperatures. When used in drilling operations, drilling fluids according to the present invention may allow the use of a lower pumping power to pump drilling muds through long distances, thereby reducing down-hole pressures. Consequently, in some embodiments, whole mud loss, fracturing and damage of the formation are all minimized. In some embodiments, drilling fluids according to the present invention may maintain the suspension characteristics typical of higher levels of organoclays at higher temperatures. Such suspension characteristics may reduce the tendency of the mud to sag. Sag may include the migration of weight material, resulting in a higher density mud at a lower fluid fraction and a lower density mud at a higher fluid fraction. A reduction of sag may be valuable in both deep water drilling as well as conventional (non deep water) drilling. The present invention may be particularly useful in deep water drilling when the mud is cooled in the riser. A mud using a drilling fluid additive according to the present invention will maintain a reduced viscosity increase in the riser when compared to drilling fluids containing conventional Theological additives.

Environmental Effects

In some embodiments, a drilling fluid additive of the present invention is environmentally acceptable. In some embodiments, a drilling fluid additive of the present invention is environmentally acceptable in terms of at least one of aerobic biodegradation in seawater, marine invertebrate toxicity, marine algal inhibition, marine sediment re-worker toxicity, and/or juvenile turbot fish toxicity.

When tested according to ISO 14669 protocol using acartia tonsa, a drilling fluid additive of some embodiments of the present invention results in a LC50(48 h) of greater than about 1000 mg/l; in some embodiments a drilling fluid additive of the present invention results in a LC50(48 h) of greater than about 1500 mg/l; in some embodiments a drilling fluid additive of the present invention results in a LC50(48 h) of greater than about 1750 mg/l; and in some embodiments a drilling fluid additive of the present invention results in a LC50(48 h) of greater than about 2000 mg/l. According to the ISO 14669 protocol, the LC50(48 h) of a substance is the lowest concentration of the substance to kill 50% of the chosen marine invertebrate during a 48 hour test.

When tested for marine algal inhibition under the OECD 201 protocol using skeletonema costatum, a drilling fluid additive of some embodiments of the present invention results in a EC50(72 h) value of greater than about 400 mg/l; in some embodiments the EC50(72 h) value is greater than about 600 mg/l; in some embodiments the EC50(72 h) value is greater than about 700 mg/l; and in some embodiments the EC50(72 h) value is about greater than about 730 mg/l. The OECD 201 protocol defines EC50 as the concentration of test substance which results in a 50% reduction in either growth or growth rate relative to the control.

When tested according to the PARCOM (Paris Commission) 1995 protocol using corophium volutator, a drilling fluid additive of some embodiments of the present invention results in a LC50(10 day) of greater than about 5,000 mg/kg; in some embodiments a drilling fluid additive of the present invention results in a LC50(10 day) of greater than about 7,500 mg/kg; in some embodiments a drilling fluid additive of the present invention results in a LC50(10 day) of greater than about 9,000 mg/kg; and in some embodiments a drilling fluid additive of the present invention results in a LC50(10 day) of greater than about 10,000 mg/kg. According to the PARCOM 1995 protocol, the LC50(10 day) of a substance is the lowest concentration of the substance to kill 50% of the chosen species during a 10 day test.

When tested according to the PARCOM (Paris Commission) 1995 protocol using scophthalmus maximus, a drilling fluid additive of some embodiments of the present invention results in a LC50(96 h) of greater than about 400 mg/kg; in some embodiments a drilling fluid additive of the present invention results in a LC50(96 h) of greater than about 600 mg/kg; in some embodiments a drilling fluid additive of the present invention results in a LC50(96 h) of greater than about 700 mg/kg; and in some embodiments a drilling fluid additive of the present invention results in a LC50(96 h) of greater than about 730 mg/kg. According to the PARCOM 1995 protocol, the LC50(96 h) of a substance is the lowest concentration of the substance to kill 50% of the chosen species during a 96 hour test.

In some embodiments, a drilling fluid additive of the present invention has a Class E environmental rating. In some embodiments, a drilling fluid additive of the present invention has a Class D environmental rating. In some embodiments, a drilling fluid additive of the present invention has a Class C environmental rating. In some embodiments, a drilling fluid additive of the present invention has a Class B environmental rating.

EXAMPLES

A drilling fluid was prepared based on the formulation in Table 1 for use in the following Examples.

TABLE 1

Drilling Fluid Formulation

| Fluid Formulation | Lbs./BBL |
|---|---|
| Synthetic Based Oil | 186 |
| Primary Emulsifier | 4 |
| Secondary Emulsifier | 2 |
| 30% Calcium Chloride Brine | 75 |
| Lime | 4 |
| Rheological Additive | See Tables for Concentrations |
| Barite | 215 |

All fluids were prepared and tested according to standard API RP 13B mud preparation guidelines using standard malt cups and a 5 spindle Hamilton Beach multimixer.

Example 1

Prior Art

BENTONE 155®, an organoclay, was added to the drilling fluid of Table 1 in amounts of 2.5 ppb and 5.0 ppb. The viscosity measurements at various shear rates and temperatures of the drilling fluid with the organoclay are included in Table 2. Table 2 shows that an oil-based drilling fluid incorporating 2.5 ppb organoclay (BENTONE 155®) alone as a Theological modifier exhibited a high shear rate (600 rpm) viscosity increase of 113.0% (54 to 115) when the temperature was reduced from 120° F. to 40° F., and a low shear rate (6 rpm) viscosity increase of 350.0% (4 to 18) when the temperature was reduced from 120° F. to 40° F.

An oil-based drilling fluid incorporating 5.0 ppb organoclay exhibited a high shear rate viscosity increase of 112.8% (78 to 166) when the temperature was reduced from 120° F. to 40° F. and a low shear rate viscosity increase of 240.0% (10 to 34) when the temperature was reduced from 120° F. to 40° F.

TABLE 2

BENTONE ® 155 Concentration Evaluation

| | Additive | | | | | |
|---|---|---|---|---|---|---|
| | BENTONE ® 155 | | | BENTONE ® 155 | | |
| | Additive(s) Concentration | | | | | |
| OFI 800 Viscosity | 2.5 ppb 120° F. Test | 2.5 ppb 40° F. Test | 2.5 ppb Percent change | 5.0 ppb 120° F. Test | 5.0 ppb 40° F. Test | 5.0 ppb Percent change |
| 600 RPM Reading | 54 | 115 | 113.0% | 78 | 166 | 112.8% |
| 300 RPM Reading | 31 | 73 | 135.5% | 50 | 112 | 124.0% |
| 200 RPM Reading | 22 | 57 | 159.1% | 39 | 91 | 133.3% |
| 100 RPM Reading | 15 | 40 | 166.7% | 27 | 66 | 144.4% |
| 6 RPM Reading | 4 | 18 | 350.0% | 10 | 34 | 240.0% |
| 3 RPM Reading | 3 | 16 | 433.3% | 9 | 32 | 255.6% |
| Apparent Visc., cPs | 27 | 58 | 114.8% | 39 | 83 | 112.8% |
| Plastic Visc., cPs | 23 | 42 | 82.6% | 28 | 54 | 92.9% |
| Yield Point, Lbs/100 ft^2 | 8 | 31 | 287.5% | 22 | 58 | 163.6% |

Example 2

Comparative 2.5 ppb BENTONE 155® was combined with a drilling fluid additive including ethoxylated amine mixed with the reaction product of a dimer acid and diethylene triamine (DETA) in the drilling fluid of Table 1. The viscosity measurements at various shear rates and temperatures of the drilling fluid with the organoclay and drilling fluid additive are included in Table 3. Table 3 shows that an oil-based drilling fluid incorporating 2.5 ppb organoclay (BENTONE 155®) and 0.5 ppb of the drilling fluid additive of this Example exhibited a high shear rate (600 rpm) viscosity increase of 59.3% (54 to 86) when the temperature was reduced from 120° F. to 40° F., and a low shear rate (6 rpm) viscosity increase of 116.7% (6 to 13) when the temperature was reduced from 120° F. to 40° F.

An oil-based drilling fluid incorporating 2.5 ppb organoclay and 1.25 ppb of the drilling fluid additive of this Example exhibited a high shear rate viscosity increase of 63.1% (65 to 106) when the temperature was reduced from 120° F. to 40° F. and a low shear rate viscosity increase of 25.0% (8 to 10) when the temperature was reduced from 120° F. to 40° F.

An oil-based drilling fluid incorporating 2.5 ppb organoclay and 2.5 ppb of the drilling fluid additive of this Example exhibited a high shear rate viscosity increase of 57.1% (77 to 121) when the temperature was reduced from 120° F. to 40° F. and a low shear rate viscosity decrease of 44.4% (9 to 5) when the temperature was reduced from 120° F. to 40° F.

TABLE 3

BENTONE ® 155 with Dimer Acid/DETA/EOamine Product Concentration Evaluation

| | Additive | | | | | | | | |
|---|---|---|---|---|---|---|---|---|---|
| | BENTONE ® 155 with Dimer Acid/DETA/EOamine Product | | | BENTONE ® 155 with Dimer Acid/DETA/EOamine Product | | | BENTONE ® 155 with Dimer Acid/DETA/EOamine Product | | |
| | Additive(s) Concentration | | | | | | | | |
| OFI 800 Viscosity | 2.5 ppb/ 0.5 ppb 120° F. Test | 2.5 ppb/ 0.5 ppb 40° F. Test | 2.5 ppb/ 0.5 ppb Percent change | 2.5 ppb/ 1.25 ppb 120° F. Test | 2.5 ppb/ 1.25 ppb 40° F. Test | 2.5 ppb/ 1.25 ppb Percent change | 2.5 ppb/ 2.5 ppb 120° F. Test | 2.5 ppb/ 2.5 ppb 40° F. Test | 2.5 ppb/ 2.5 ppb Percent change |
| 600 RPM Reading | 54 | 86 | 59.3% | 65 | 106 | 63.1% | 77 | 121 | 57.1% |
| 300 RPM Reading | 33 | 54 | 63.6% | 39 | 63 | 61.5% | 47 | 66 | 40.4% |
| 200 RPM Reading | 24 | 42 | 75.0% | 28 | 45 | 60.7% | 35 | 47 | 34.3% |
| 100 RPM Reading | 16 | 27 | 68.8% | 19 | 28 | 47.4% | 22 | 26 | 18.2% |
| 6 RPM Reading | 6 | 13 | 116.7% | 8 | 10 | 25.0% | 9 | 5 | −44.4% |
| 3 RPM Reading | 6 | 12 | 100.0% | 7 | 9 | 28.6% | 8 | 4 | −50.0% |
| Apparent Visc., cPs | 27 | 43 | 59.3% | 33 | 53 | 60.6% | 39 | 61 | 56.4% |
| Plastic Visc., cPs | 21 | 32 | 52.4% | 26 | 43 | 65.4% | 30 | 55 | 83.3% |
| Yield Point, Lbs/100 ft^2 | 12 | 22 | 83.3% | 13 | 20 | 53.8% | 17 | 11 | −35.3% |

Example 3

Comparative 2.5 ppb BENTONE 155® was combined with a drilling fluid additive including the reaction product of a dimer acid and diethylene triamine (DETA) in the drilling fluid of Table 1. The viscosity measurements at various shear rates and temperatures of the drilling fluid with the organoclay and drilling fluid additive are included in Table 4. Table 4 shows that an oil-based drilling fluid incorporating 2.5 ppb organoclay (BENTONE 155®) and 0.5 ppb of the drilling fluid additive of this Example exhibited a high shear rate (600 rpm) viscosity increase of 55.7% (61 to 95) when the temperature was reduced from 120° F. to 40° F., and a low shear rate (6 rpm) viscosity increase of 62.5% (8 to 13) when the temperature was reduced from 120° F. to 40° F.

An oil-based drilling fluid incorporating 2.5 ppb organoclay and 0.75 ppb of the drilling fluid additive of this Example exhibited a high shear rate viscosity increase of 52.2% (67 to 102) when the temperature was reduced from 120° F. to 40° F. and a low shear rate viscosity increase of 40.0% (10 to 14) when the temperature was reduced from 120° F. to 40° F.

An oil-based drilling fluid incorporating 2.5 ppb organoclay and 1.0 ppb of the drilling fluid additive of this Example exhibited a high shear rate viscosity increase of 47.9% (73 to 108) when the temperature was reduced from 120° F. to 40° F. and a low shear rate viscosity increase of 25.0% (12 to 15) when the temperature was reduced from 120° F. to 40° F.

TABLE 4

BENTONE ® 155 with Dimer Acid/DETA Product Concentration Evaluation

| | Additive | | | | | | | | |
|---|---|---|---|---|---|---|---|---|---|
| | BENTONE ® 155 with Dimer Acid/DETA Product | | | BENTONE ® 155 with Dimer Acid/DETA Product | | | BENTONE ® 155 with Dimer Acid/DETA Product | | |
| | Additive(s) Concentration | | | | | | | | |
| OFI 800 Viscosity | 2.5 ppb/ 0.5 ppb 120° F. Test | 2.5 ppb/ 0.5 ppb 40° F. Test | 2.5 ppb/ 0.5 ppb Percent change | 2.5 ppb/ 0.75 ppb 120° F. Test | 2.5 ppb/ 0.75 ppb 40° F. Test | 2.5 ppb/ 0.75 ppb Percent change | 2.5 ppb/ 1.0 ppb 120° F. Test | 2.5 ppb/ 1.0 ppb 40° F. Test | 2.5 ppb/ 1.0 ppb Percent change |
| 600 RPM Reading | 61 | 95 | 55.7% | 67 | 102 | 52.2% | 73 | 108 | 47.9% |
| 300 RPM Reading | 38 | 59 | 55.3% | 42 | 65 | 54.8% | 45 | 67 | 48.9% |
| 200 RPM Reading | 29 | 46 | 58.6% | 32 | 53 | 65.6% | 36 | 53 | 47.2% |
| 100 RPM Reading | 19 | 30 | 57.9% | 21 | 33 | 57.1% | 24 | 34 | 41.7% |
| 6 RPM Reading | 8 | 13 | 62.5% | 10 | 14 | 40.0% | 12 | 15 | 25.0% |

TABLE 4-continued

BENTONE ® 155 with Dimer Acid/DETA Product Concentration Evaluation

| | Additive | | | | | | | | |
|---|---|---|---|---|---|---|---|---|---|
| | BENTONE ® 155 with Dimer Acid/DETA Product | | | BENTONE ® 155 with Dimer Acid/DETA Product | | | BENTONE ® 155 with Dimer Acid/DETA Product | | |
| | Additive(s) Concentration | | | | | | | | |
| OFI 800 Viscosity | 2.5 ppb/ 0.5 ppb 120° F. Test | 2.5 ppb/ 0.5 ppb 40° F. Test | 2.5 ppb/ 0.5 ppb Percent change | 2.5 ppb/ 0.75 ppb 120° F. Test | 2.5 ppb/ 0.75 ppb 40° F. Test | 2.5 ppb/ 0.75 ppb Percent change | 2.5 ppb/ 1.0 ppb 120° F. Test | 2.5 ppb/ 1.0 ppb 40° F. Test | 2.5 ppb/ 1.0 ppb Percent change |
| 3 RPM Reading | 7 | 12 | 71.4% | 9 | 13 | 44.4% | 11 | 14 | 27.3% |
| Apparent Visc., cPs | 31 | 48 | 54.8% | 34 | 51 | 50.0% | 37 | 54 | 45.9% |
| Plastic Visc., cPs | 23 | 36 | 56.5% | 25 | 37 | 48.0% | 28 | 41 | 46.4% |
| Yield Point, Lbs/100 ft 2 | 15 | 23 | 53.3% | 17 | 28 | 64.7% | 17 | 26 | 52.9% |

Example 4

A drilling fluid additive was prepared from the reaction product of a dimer acid and diethylene triamine (DETA). A second drilling fluid additive was prepared from the reaction product of a dimer acid, diethylene triamine (DETA), and an alkoxylated amine. The additives were tested according to several environmental protocols. The test results are listed in Table 5 below.

TABLE 5

Environmental Testing Results

| Test Suite | Species | Protocol | Dimer Acid/DETA Product | Dimer Acid/ DETA/ Alkoxylated Amine Product |
|---|---|---|---|---|
| Marine invertebrate toxicity | Acartia tonsa | ISO 14669 | LC50(48 h) > 2000 mg/l | LC50(48 h): 2.0 mg/l |
| Marine algal inhibition | Skeletonema costatum | OECD 201 | EC50(72 h): 730 mg/l | EC50(72 h): 0.23 mg/l |
| Marine sediment reworker toxicity | Corophium volutator | PARCOM 1995 | LC50(10 day) > 10,000 mg/kg | LC50(10 day): 274.3 mg/kg |
| Juvenile turbot fish toxicity | Scophthalmus maximus | PARCOM 1995 | LC50(96 h) > 730 mg/kg | LC50(96 h): 6.4 mg/kg |

The additives were tested according to the ISO 14669 protocol for marine invertebrate toxicity using acartia tonsa. The dimer acid/DETA product demonstrated a much lower toxicity. The results show that more than 2,000 mg/l of the dimer acid/DETA product was required in order to kill 50% of the arcartia tonsa over 48 hours, whereas a concentration of only 2.0 mg/l of the dimer acid/DETA/alkoxylated amine product was required to accomplish the same result.

The additives were tested for marine algal inhibition under the OECD 201 protocol, using skeletonema costatum. The dimer acid/DETA product demonstrated a significantly lower inhibition rate than the dimer acid/DETA/alkoxylated amine product. As shown in Table 5, a concentration of more than 730 mg/l of the dimer acid/DETA product was required in order to inhibit the skeletonema costatum by 50% over 72 hours, whereas a concentration of only 0.23 mg/l of the dimer acid/DETA/alkoxylated amine was required to accomplish the same result.

The dimer acid/DETA product also demonstrated lower toxicity than the dimer acid/DETA/alkoxylated amine product when tested for marine sediment reworker toxicity according to PARCOM (Paris Commission) 1995, using corophium volutator. As shown in Table 5, a concentration of more than 10,000 mg/kg of the dimer acid/DETA product was required in order to kill 50% of the corophium volutator over 10 days, whereas a concentration of only 274.3 mg/kg of the dimer acid/DETA/alkoxylated amine product was required to accomplish the same result.

Similarly, the dimer acid/DETA product demonstrated lower toxicity than the dimer acid/DETA/alkoxylated amine product when tested for juvenile turbot fish toxicity according to the PARCOM 1995 protocol, using scophthalmus maximus. A concentration of more than 730 mg/kg of the dimer acid/DETA product was required in order to kill 50% of the scopthalmus maximus over 96 hours, whereas a concentration of only 6.4 mg/kg of the dimer acid/DETA/alkoxylated amine product was required to accomplish similar results.

The foregoing description and examples have been set forth merely to illustrate the invention and are not intended to be limiting. Since modifications of the disclosed embodiments incorporating the spirit and substance of the invention may occur to persons skilled in the art, the invention should be construed broadly to include all variations falling within the scope of the appended claims and equivalents thereof.

I claim:

1. A method of providing a substantially constant rheological profile of an oil-based drilling fluid over a temperature range of about 120° F. to about 40° F. comprising adding a drilling fluid additive to the drilling fluid, wherein the drilling fluid additive consists essentially of a reaction product of
   (a) a dimer fatty acid selected from the group consisting of hydrogenated, partially hydrogenated and non-hydrogenated dimer acids with from about 20 to about 48 carbon atoms, with at least two carboxylic moieties; and
   (b) polyethylene polyamine having an amine functionality of two or more.

2. The method of claim 1, wherein the polyamine is selected from the group consisting of ethylenediamine, diethylenetriamine, triethylenetriamine and tetraethylenepentamine.

3. The method of claim 1, wherein the polyamine comprises diethylenetriamine.

4. The method of claim 1, wherein the reaction product further comprises a trimer fatty acid.

5. The method of claim 1, further comprising adding one or more emulsifiers to the drilling fluid.

6. The method of claim 1, further comprising adding an organoclay to the drilling fluid.

7. The method of claim 1, further comprising adding a non-organoclay rheological additive to the drilling fluid.

8. The method of claim 1, further comprising adding a fluid loss reducing additive to the drilling fluid.

9. The method of claim 1, further comprising adding a solvent.

10. The method of claim 1 wherein the increase in high shear rate viscosity of the drilling fluid is less than about 75% when the drilling fluid is cooled from about 120° F. to about 40° F.

11. The method of claim 1 wherein the increase in high shear rate viscosity of the drilling fluid is less than about 60% when the drilling fluid is cooled from about 120° F. to about 40° F.

12. The method of claim 1, comprising adding less than about 2 pounds per barrel ("ppb") drilling fluid additive to the drilling fluid.

13. The method of claim 1, comprising adding less than about 1.5 ppb drilling fluid additive to the drilling fluid.

14. The method of claim 1, comprising adding less than about 1.0 ppb drilling fluid additive to the drilling fluid.

15. The method of claim 1, wherein the reaction product has an average molecular weight of about 2,000 to about 2030.

16. The method of claim 1, wherein the reaction product has an average molecular weight of about 2,010 to about 2,020.

17. A method of providing a substantially constant rheological profile of an oil-based drilling fluid over a temperature range of about 120° F. to about 40° F. comprising adding a drilling fluid additive to the drilling fluid, wherein the drilling fluid additive comprises a reaction product of
   (a) a dimer fatty acid with at least two carboxylic moieties; and
   (b) a polyamine having an amine functionality of two or more
   wherein the drilling fluid additive has an LC50(48 h) value of greater than about 1000 mg/l as determined from the ISO 14669 protocol using acartia tonsa.

18. The method of claim 17, wherein the drilling fluid additive has an EC50(72 h) value of greater than about 400 mg/l as determined from the OECD 201 protocol using skeletonema costatum.

19. The method of claim 17, wherein the drilling fluid additive has an LC50(10 day) value of greater than about 5,000 mg/kg as determined from the PARCOM 1995 protocol using corphium volutator.

20. The method of claim 17, wherein the drilling fluid additive has an LC50(96 h) value of greater than about 400 mg/kg as determined from the PARCOM 1995 protocol using scophthalmus maximus.

21. A method of providing a substantially constant rheological profile of an oil-based drilling fluid over a temperature range of about 120° F. to about 40° F. comprising adding a drilling fluid additive to the drilling fluid, wherein the drilling fluid additive comprises a reaction product of
   (a) a dimer fatty acid with at least two carboxylic moieties; and
   (b) a polyamine having an amine functionality of two or more wherein the drilling fluid additive has an environmental rating of Class C, Class D, or Class E.

22. A composition consisting essentially of a reaction product of
   (a) a dimer fatty acid selected from the group consisting of hydrogenated, partially hydrogenated and non-hydrogenated dimer acids with from about 20 to about 48 carbon atoms, with at least two carboxylic moieties; and
   (b) polyethylene polyamine having an amine functionality of two or more.

23. The composition of claim 22 wherein the polyamine is selected from the group consisting of ethylenediamine, diethylenetriamine, triethylenetriamine and tetraethylenepentamine.

24. An oil-based drilling fluid comprising the composition of claim 22.

25. The oil-based drilling fluid of claim 24, wherein the increase in high shear rate viscosity of the drilling fluid is less than about 75% when the said drilling fluid is cooled from about 120° F. to about 40° F.

26. The oil-based drilling fluid of claim 24, wherein the increase in high shear rate viscosity of the drilling fluid is less than about 60% when the said drilling fluid is cooled from about 120° F. to about 40° F.

27. The composition of claim 22, wherein the polyamine comprises diethylenetriamine.

28. The composition of claim 22, wherein the reaction product further comprises a trimer fatty acid.

29. The composition of claim 22, further comprising one or more emulsifier.

30. The composition of claim 22, further comprising an organoclay.

31. The composition of claim 22, further comprising a non-organoclay rheological additive.

32. The composition of claim 22, further comprising a fluid loss reducing additive.

33. The composition of claim 22, further comprising a solvent.

34. An oil-based drilling fluid comprising less than about 2 ppb of the composition of claim 22.

35. An oil-based drilling fluid comprising less than about 1.5 ppb of the composition of claim 22.

36. An oil-based drilling fluid comprising less than about 1 ppb of the composition of claim 22.

37. The composition of claim 22, wherein the reaction product has an average molecular weight of about 2,000 to about 2,030.

38. The composition of claim 22, wherein the reaction product has an average molecular weight of about 2,010 to about 2,020.

39. A drilling fluid additive comprising the reaction product of
- (a) a dimer fatty acid with at least two carboxylic moieties; and
- (b) a polyamine having an amine functionality of two or more wherein the drilling fluid additive has an EC50(72 h) value of greater than about 400 mg/l as determined from the OECD 201 protocol using skeletonema costatum.

40. The drilling fluid additive of claim 39, wherein the drilling fluid additive has an LC50(48 h) value of greater than about 1000 mg/l as determined from the ISO 14669 protocol using acartia tonsa.

41. The drilling fluid additive of claim 39, wherein the drilling fluid additive has an LC50(10 day) value of greater than about 5,000 mg/kg as determined from the Parcom 1995 protocol using corophium volutator.

42. The drilling fluid additive of claim 39, wherein the drilling fluid additive has an LC50(96 h) value of greater than about 400 mg/kg as determined from the Parcom 1995 protocol using scophthalmus maximus.

43. A drilling fluid additive comprising the reaction product of
- (a) a dimer fatty acid with at least two carboxylic moieties; and
- (b) a polyamine having an amine functionality of two or more, wherein the drilling fluid additive has an environmental rating of Class C, Class D, or Class E.

* * * * *